United States Patent
Seemann et al.

(10) Patent No.: US 7,624,349 B2
(45) Date of Patent: Nov. 24, 2009

(54) DECLARATIVE DEFINITION ENABLING GRAPHICAL DESIGNER REUSE

(75) Inventors: Jochen Seemann, Duvall, WA (US); Gareth A. Jones, Lower Cambourne (GB); Stuart J. H. Kent, Canterbury (GB); Stephen J. Cook, Bishop's Stortford (GB)

(73) Assignee: Microsoft Corporation, Redmond, WA (US)

(*) Notice: Subject to any disclaimer, the term of this patent is extended or adjusted under 35 U.S.C. 154(b) by 293 days.

(21) Appl. No.: 11/385,124

(22) Filed: Mar. 21, 2006

(65) Prior Publication Data

US 2007/0222783 A1   Sep. 27, 2007

(51) Int. Cl.
  *G06F 3/00* (2006.01)
(52) U.S. Cl. .................. 715/762; 717/117; 715/700
(58) Field of Classification Search .............. None
  See application file for complete search history.

(56) References Cited

U.S. PATENT DOCUMENTS

| | | | |
|---|---|---|---|
| 6,199,195 B1 | 3/2001 | Goodwin et al. ............... 717/1 |
| 6,246,403 B1 | 6/2001 | Tomm ........................ 345/333 |
| 6,289,501 B1 | 9/2001 | Mutschler, III ............... 717/1 |
| 6,342,907 B1 | 1/2002 | Petty et al. .................. 345/762 |
| 6,343,265 B1 | 1/2002 | Glebov ........................ 703/25 |
| 6,343,297 B1* | 1/2002 | D'Anjou et al. ......... 707/104.1 |
| 6,502,236 B1* | 12/2002 | Allen et al. .................. 717/136 |
| 6,550,054 B1 | 4/2003 | Stefaniak .................... 717/104 |
| 6,701,513 B1 | 3/2004 | Bailey ........................ 717/109 |
| 6,851,089 B1 | 2/2005 | Erickson et al. ............. 715/513 |
| 6,859,919 B1 | 2/2005 | Deffler et al. ............... 717/100 |
| 6,970,813 B1 | 11/2005 | Houlding et al. .............. 703/13 |
| 6,971,034 B2 | 11/2005 | Samson et al. |
| 2003/0043144 A1* | 3/2003 | Pundarika et al. ........... 345/419 |
| 2003/0151611 A1* | 8/2003 | Turpin et al. ................. 345/589 |
| 2004/0064755 A1 | 4/2004 | Therien |
| 2004/0068731 A1* | 4/2004 | Davis et al. .................. 719/310 |
| 2004/0107414 A1* | 6/2004 | Bronicki et al. ............. 717/105 |
| 2005/0081161 A1* | 4/2005 | MacInnes et al. ........... 715/765 |
| 2006/0236307 A1* | 10/2006 | Debruin et al. .............. 717/117 |
| 2007/0220415 A1* | 9/2007 | Cheng et al. ................. 715/503 |

FOREIGN PATENT DOCUMENTS

EP    1139205    10/2001

OTHER PUBLICATIONS

Aurthor: Phillip Kerman, Title: "Teach Yourself Macromedia Flash 5 in 24 Hours", Date: 2001, Publisher: Phillip Kerman, pp. 20, 21, 111-120, 207, and 394-398.*
Building Shared Graphical Editors Using the Abstraction-Link-View Architecture; Tom Brinck; p. 1-13.
The Development of Phedias: A Case Shell; X. Wang & P. Loucopoulos; p. 122-131; 1995 IEEE.
The Graphical Editing Framework (GEF) and the Interplay of GEF With EMF; Chris Lenz, Feb. 6, 2005.

* cited by examiner

*Primary Examiner*—Kee M Tung
*Assistant Examiner*—David H Chu
(74) *Attorney, Agent, or Firm*—Workman Nydegger (57) ABSTRACT

The reuse of one or more shared components of graphical modeling tools amongst multiple graphical modeling tools. Graphical designers, or graphical modeling tools, allow for the construction of graphical representations of models in which objects, object properties, and object interrelationships may be visualized. Thus, a variety of graphical modeling tools may be supported and populated with portions of other graphical modeling tools.

17 Claims, 8 Drawing Sheets

DECLARATIVE DEFINITION ENABLING GRAPHICAL DESIGNER REUSE

BACKGROUND

Computing technology has contributed enormously to the advancement of humankind. Computing systems come in a wide variety of physical forms including desktop computers, laptop computers, personal digital assistants, telephones, and even devices that have not been conventionally thought of as computing systems such as, for example, refrigerators and automobiles. Thus, a computing system may be any device or system that has a processor and a memory of any type.

One common application that computing technology supports are graphical modeling tools (also called "graphical designers"). Graphical modeling tools facilitate the orderly and efficient construction of graphical models. Graphical models include the visual representation of a collection of interrelated objects. Graphical models may be used in a different way by a wide variety of domains. For instance, workflows, organization charts, electrical circuits, software architectures, software flowcharts, may each be represented using graphical models. There may be literally thousands of different applications in which graphical modeling tools may be useful. In each case, the types of objects and interrelationships may be quite different. Even within a single domain of application, there may be definite preferences on how the objects and interrelationships are displayed. For instance, one bank may prefer one graphical modeling style for representing economic transactions, while another bank may represent a different graphical modeling style for economic transactions.

Building graphical modeling tools is a challenging and time consuming task. The building of a typical graphical designer may involve a software developer implementing a design surface that implements the graphical notation, a toolbox that allows the user to drag and drop element onto the design surface, a mechanism for representing properties of the objects on the design surface—the properties representing meaningful information about the problem the user is trying to model, and other User Interface (UI) elements like an explorer to navigate through the model data.

When one considers the enormous number of domains and preferences for different graphical designs, the task of building graphical modeling tools for each domain and preference seems ominous.

BRIEF SUMMARY

Graphical designers, or graphical modeling tools, allow for the construction of graphical representations of models that includes elements, some of the elements being visualized. Although not required, embodiments of the present invention relate to the sharing of one or more shared elements between multiple graphical designers to thereby permit a greater selection of elements to be used in a given graphical designer. One location may have a declarative definition of an element, while the element may be incorporated into declarative definitions of graphical designers by referring to the declarative definition of the shared element without expressly including the declarative definition of the shared element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

Embodiments of the present invention extend to the reuse of declaratively defined elements of graphical modeling tools amongst multiple graphical modeling tools. First, an example computing system will be described in which the principles of the present invention may be used with respect to FIG. 1. Then, the principles of the present invention will be described in further detail with respect to the subsequent Figures.

Figure 1:
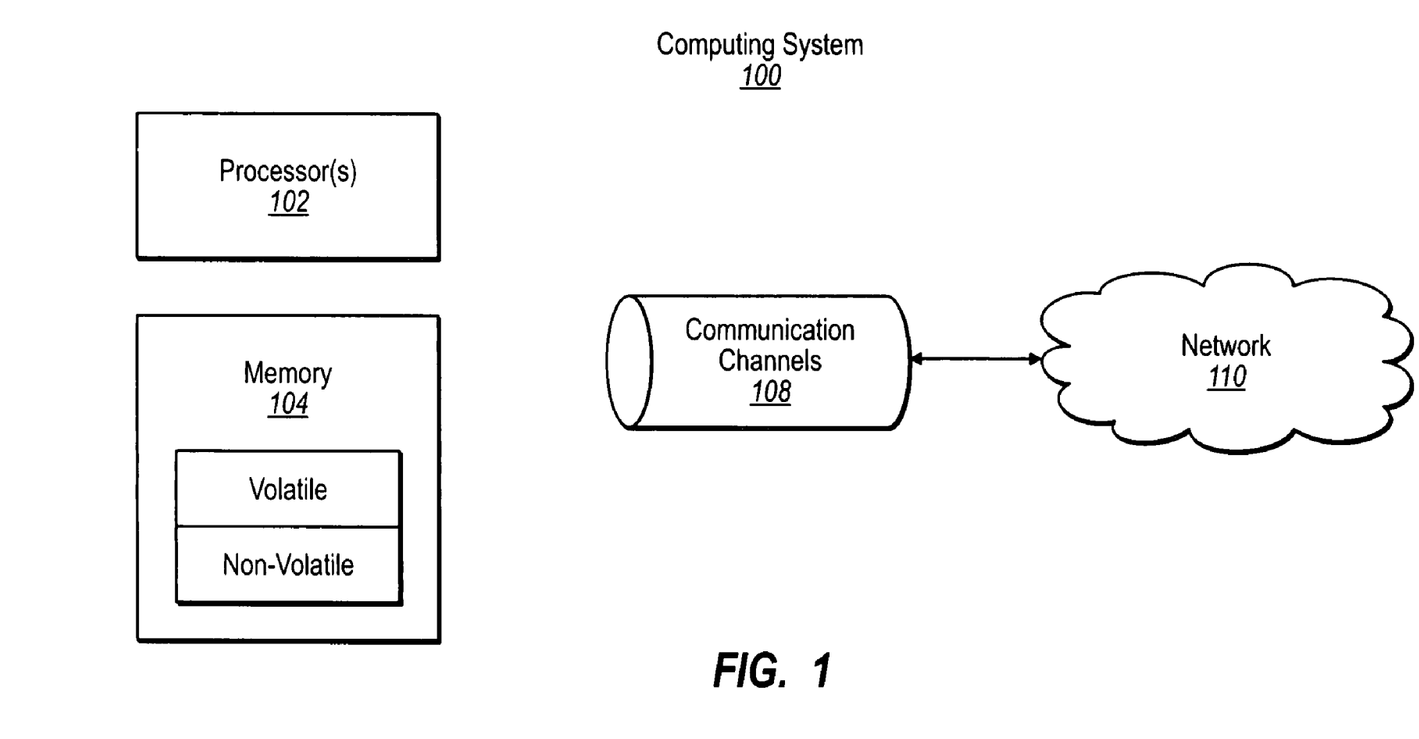
FIG. 1 illustrates a computing system in which embodiments of the principles of the present invention may operate.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
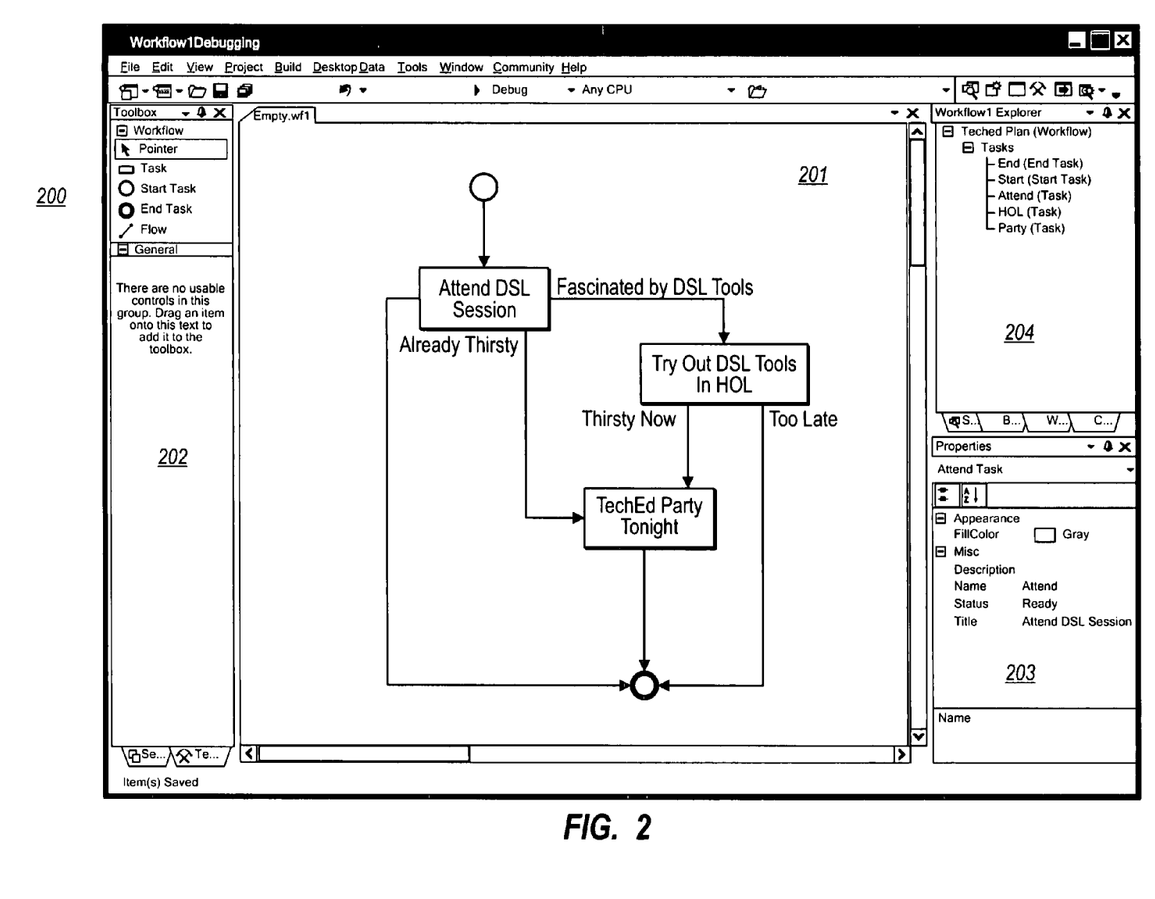
FIG. 2 illustrates a user interface that displays a graphical designer.

FIG. 2 illustrates a user interface 200 that displays a graphical designer. In this description and in the claims, a "graphical designer" or "graphical modeling tool" is any application that permits the construction of a graphical model of one or more visualized objects and interrelationships. A single application in some cases may support multiple graphical designers. As previously mentioned, different application domains and preferences may warrant different object classes, interrelationships, and visualizations of the same. The principles of the present invention permit sharing of declaratively defined elements amongst multiple graphical designers. Accordingly, the term "graphical designer" and "graphical modeling tool" is a broad term that is by no means restricted to the example that will now be described with respect to FIG. 2.

The user interface 200 includes a design surface 201 that implements the graphical notation, a toolbox pane 202 that allows the user to drag and drop element onto the design surface, a property pane 203 for representing properties of the object on the design surface, and a navigation pane 204 to navigate through the model data.

The graphical designer 200 may be used to construct a variety of models. However, each graphical designer 200 will permit certain types of object classes, relationships, and visualizations of the same. The graphical designer is defined in a declarative manner using a declarative definition. Instead of using a list of detailed instructions provided to a computer to define the graphical designer, the graphical designer declarative definition specifies a set of declarative definitions that each defines an associated element of the graphical designer. The "element" may be any aspect of the graphical designer including, for example, object classes, relationships visualizations of the same, or any other aspect of the graphical designer (visualized or non-visualized). The purpose of the declarative definition is to be a minimal, efficient way of describing the behavior of the graphical designer, omitting all irrelevant detail. At some future point, the declarative definition may be interpreted by an interpreter or a code generator to generate instructions sequences that abide by the specification defined by the declarative definitions. One way of representing a declarative definition of a graphical designer is using an eXtensible Markup Language (XML) document. However, the declarative definition may be represented in binary or other non-text forms as well. The implementation of a given element of the graphical designer may be altered by simply altering the declarative definition describing the element, rather than altering executable code that implements details of the graphical designer.

As just mentioned, the declaration definition of the graphical designer may be in the form of an extensible Markup Language (XML) document. In one embodiment, the declarative definition of the graphical designer may include domain model components in the form of object classes that are specific to the particular problem domain and that thus define specific objects, their properties, and relationship types between the objects. Depending on the problem domain, these elements may vary considerably. For instance, if the graphical designer were used in financial applications, object classes might include currencies, payments, invoices, and the like. If the graphical designer were used in scheduling applications, the object class might include tasks, order of completion dependencies, and the like. If a user builds a designer to model the structure of a computer network, the user might define an object called "Server" with properties like "Operating System" and "Storage Capacity", and relationships like "Network Connection".

Domain models may include three kinds of elements: domain classes, relationships among domain classes (which themselves also have the properties of domain classes), and enumerations. Each of these elements may appear in a schema definition and may be reused independently by referencing the element from another designer.

The graphic designer declarative definition may also include notation elements that may be used to visualize objects and relationships of the design model. For example, in the computer networking domain, the graphical designer might use an icon to visualize the "Server" object and shows the name of the "Server" object as text next to the icon. The network connection might be visualized using an arrow to another "Server" object.

The notation definition may specify three kinds of elements: shapes, connectors and decorators. For instance, the shapes may be geometry shapes (using predefined geometries like 'Rectangle'), image shapes in which the object is represented as an image, or a complex shape with rich behavior. Connectors are elements that connect two shapes. For connectors, the designer builder can specify which type of shape can be connected to which other type of shape by this connector. Decorators add text or icons to shapes and connectors. Each of these elements may also appear in the schema definition for the declarative definition of the graphical design.

The declarative definition may also include a mapping definition. The mapping definition specifies which elements of the domain model are associated with which elements of the notation. For example, in the sample mentioned above, the graphical designer may map the domain object for "Server" to the shape that is used to visualize the "Server" object.

The mapping definition specifies four kinds of elements: TextDecoratorMaps, IconDecoratorMaps, ShapeMaps, and ConnectorMaps. The TextDecoratorMaps or IconDecoratorMaps map values displayed in a decorator to values of an object. ShapeMaps maps the shape itself to one or more objects. This mapping is depending on the type of the shape. Each ShapeMap may contain a list of DecoratorMaps for this shape. ConnectorMaps map the connector to a relationship between two domain objects. Each ConnectorMap may contain a list of DecoratorMaps for this connector. Once again, each of these elements may appear in the schema definition file for the graphical design declarative definition.

Figure 3:
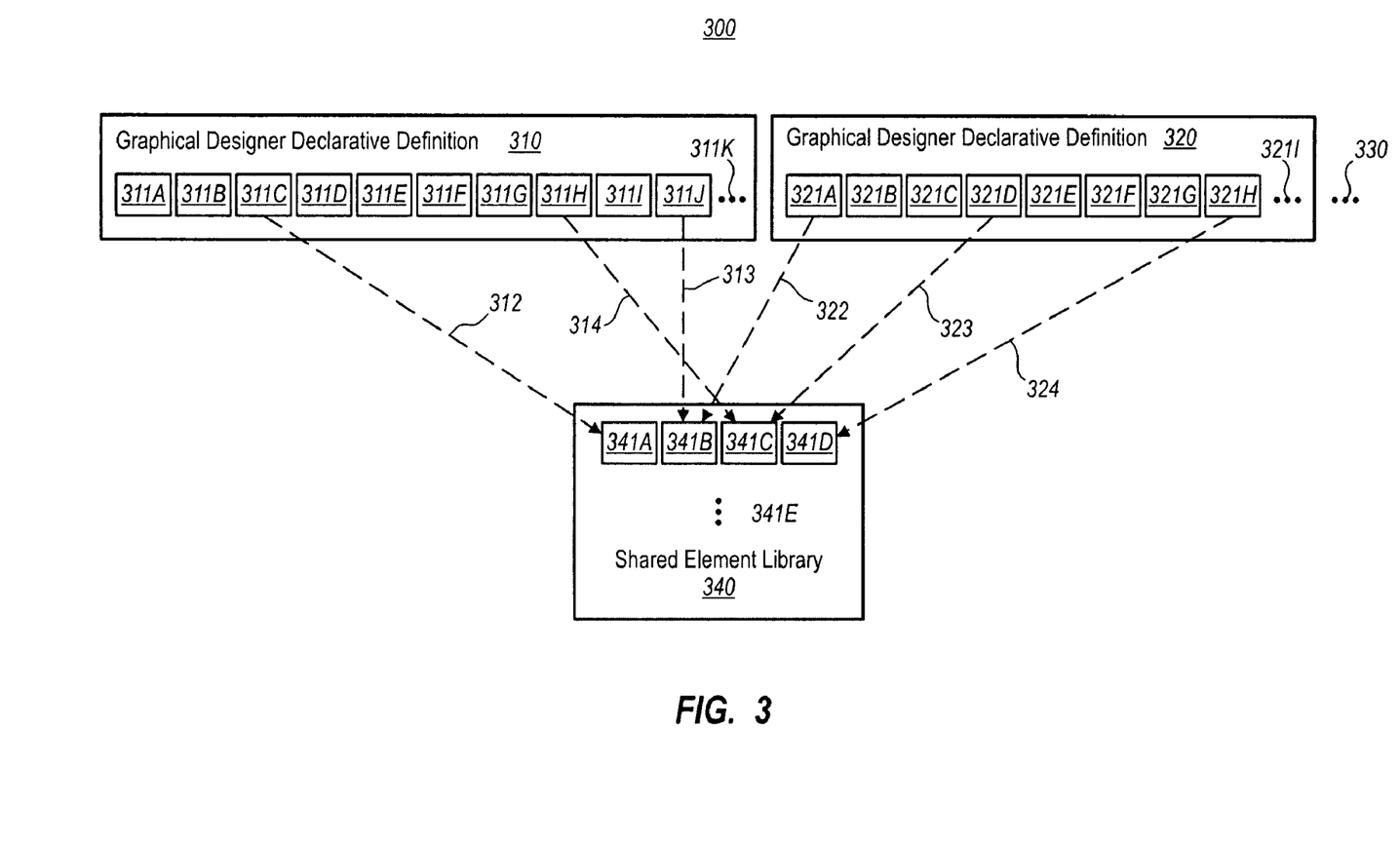
FIG. 3 illustrates an environment that includes declarative definitions of multiple graphical designers in which elements of the graphical designers are shared.

FIG. 3 schematically illustrates a software architecture environment 300 that includes declarative definitions of multiple graphical designers in which there are shared elements. In particular, in this example, a first graphical designer declarative definition 310 includes elements 311A through 311J amongst potentially others as represented by the horizontal ellipses 311K. A second graphical designer declarative definition 320 includes elements 321A through 321H amongst potentially others as represented by the horizontal ellipses 321I. There may be other declarative definitions of graphical designers as represented by the horizontal ellipses 330.

The graphical designer declarative definitions include some declarative definitions of its constituent elements. For instance, the first graphical designer declarative definition 310 includes declarative definitions for elements 311A, 311B, 311D, 311E, 311F, 311G and 311I. The second graphical designer declarative definition 320 includes declarative definitions for elements 321B, 321C, 321E, 321F and 321G.

The graphical designer declarative definitions may also include declarations for some of the elements, without including an expressed definition for the element. For instance, the first graphical designer declarative definition 310 includes declarations for elements 311C, 311H, and 311J in the form of a corresponding reference 312, 314 and 313 to a corresponding declarative definition of a shared element 341A, 341C and 341B. The second graphical designer declarative definition 320 includes declarations for elements 321A, 321D and 321H in the form of corresponding references 322, 323 and 324 to a corresponding declarative definition of a shared element 341B, 341C and 341D.

The declarative definitions for the shared elements may thus be reused in a variety of different graphical designers by merely referring to the shared element without including a complete declarative definition of the element. In one embodiment, the shared element declarative definitions may be included within a library 340 of shared elements. For instance, in this case, the library is illustrated as including the declarative definitions of the corresponding elements 341A through 341D amongst potentially others as represented by the vertical ellipses 341E. The library 340 may be external to all graphical designer declarative definitions. However, the library 340 may also be fully contained within a single graphical designer declarative definition, or even distributed through multiple graphical designer declarative definitions. The shared elements may be, for example, 1) a component of a domain model including at least one of a domain class, a relationship amongst domain classes, and an enumeration element, 2) a graphical notation including at least one of a shape, a connector, or a decorator element and/or 3) a mapping definition.

Figure 4:
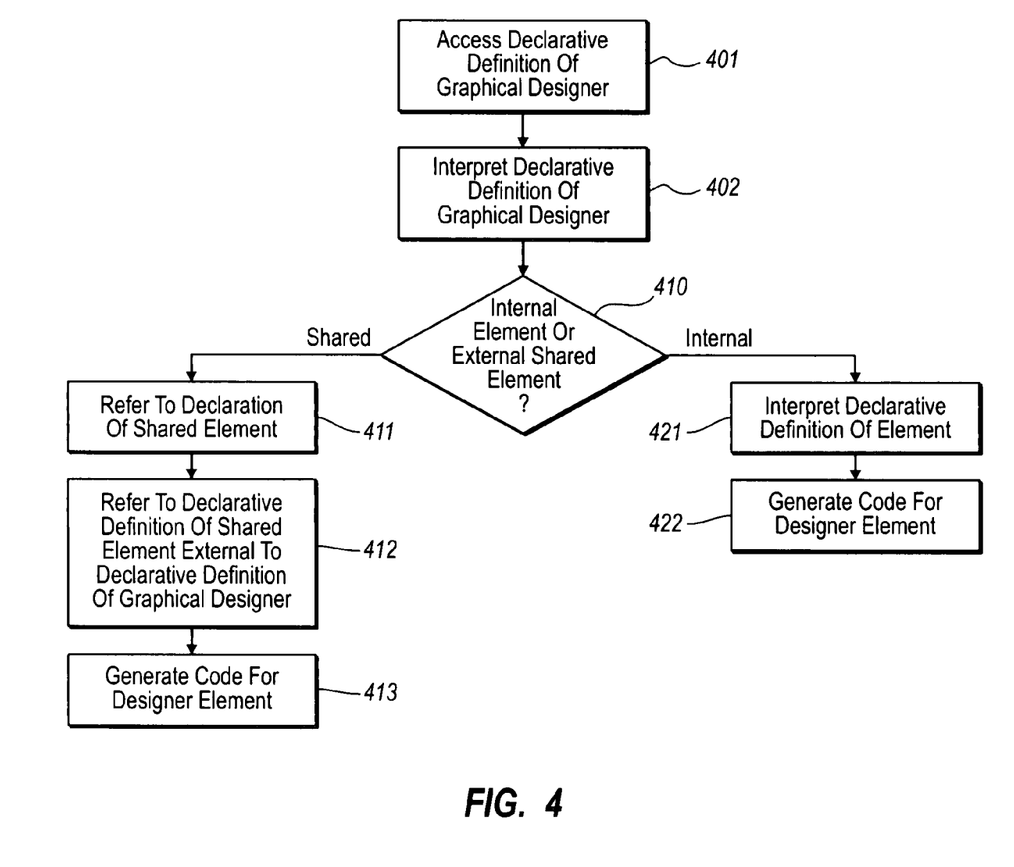
FIG. 4 illustrates a flowchart of a method for implementing a graphical designer having shared elements in accordance with one embodiment of the principles of the present invention.

FIG. 4 illustrates a flowchart of a method 400 for reusing shared elements in a graphical designer declarative definition in accordance with one embodiment of the principles of the present invention. The method 400 may be repeated for each graphical designer declarative definition. The method 400 will be described with frequent reference to the example architecture 300 illustrated in FIG. 3.

For a given graphical designer (also referred to as a "graphical modeling tool") declarative definition, the method 400 accesses the declarative definition of the graphical designer (act 401). For instance, the graphical designer declarative definition 310 of FIG. 3 is accessed. The declarative definition of the graphical design is then interpreted (act 402).

While interpreting, an interpretation component may evaluate multiple elements of the graphical designer. More specifically, the declarative definition for each of the elements is evaluated. The flow for evaluating an element will differ depending on whether or not the element is defined internal to the graphical designer declarative definition (as is the case for elements 311A, 311B, 311D, 311E, 311F, 311G and 311I), or whether the element is a shared element that is defined external to the graphical designer declarative definition (as is the case for elements 311C, 311H and 311J) (decision block 410). The element may be identified as a shared or non-shared element based on the element declaration itself. In this description and in the claims, a "declaration" of the component is defined as a reference to a declarative definition, but not including the declarative definition.

If the element is an external shared element ("Shared" in decision block 410), the declaration of the element is accessed (act 411), the declaration including a reference to the location of the declarative definition of the element. The location that contains the declarative definition is then accessed, whereupon the declaration definition is referred to (act 412). Code for the shared designer element is then generated (act 413) using the declarative definition of the shared element external to the graphical designer declarative definition. For instance, the code may cause the shared element to be rendered on the display if it is a visual element, and/or instantiated in memory regardless of whether it is visual or non-visual element. The code generation for the designer element may be accomplished in any manner using the declarative definition.

If, on the other hand, the declarative definition of the element is internal to the graphical designer declarative definition ("Internal" in decision block 410), the declarative definition is interpreted (act 421) using an interpretation component, and the code for the designer element is generated (act 422). When the code is executed, the element is caused to be rendered and/or instantiated in memory to thereby perform its defined function.

Figure 5:
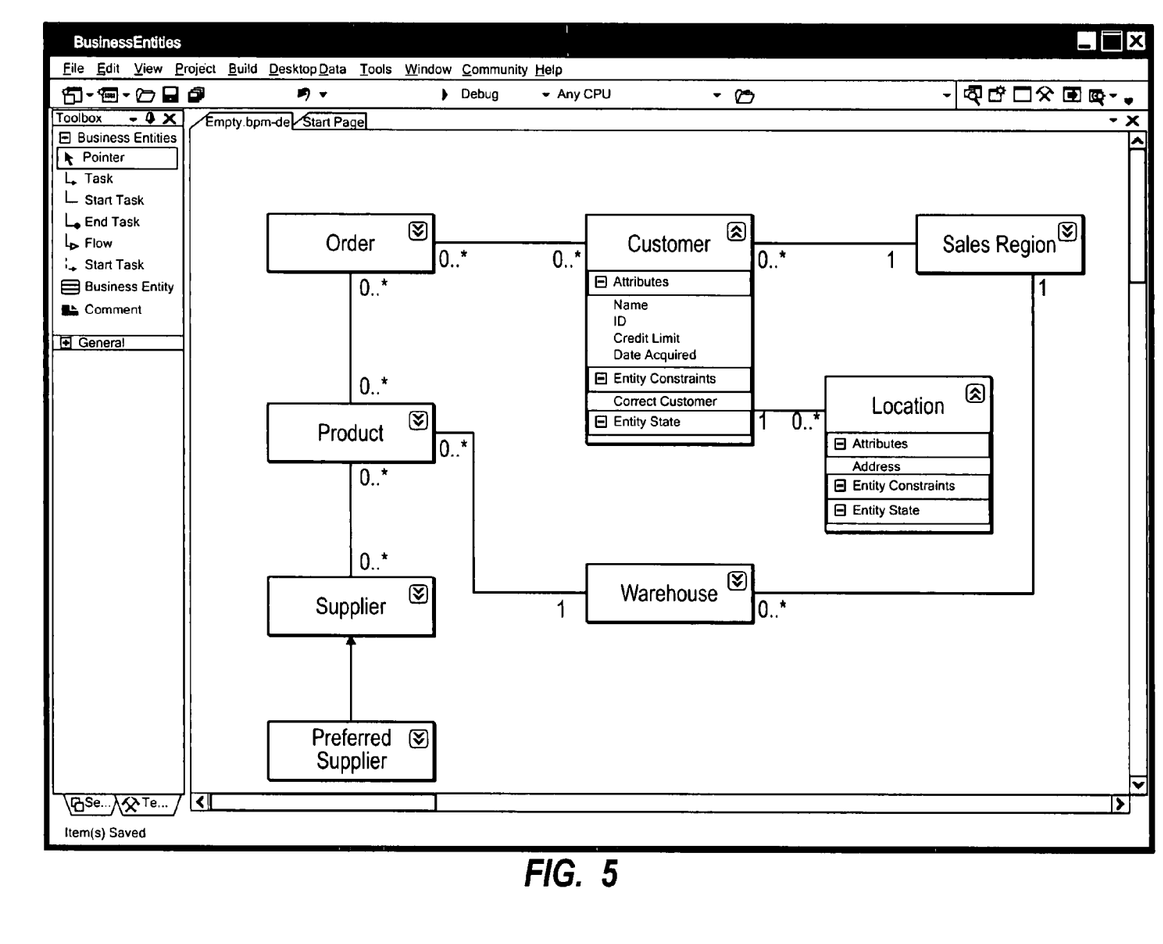
FIG. 5 illustrates a user interface of a graphical designer.

Having described the principles of the present invention and some specific examples, a more specific example will now be described with respect to FIGS. 5 through 8. In a first graphical designer declarative definition is used in a business analyst application in an enterprise environment. A resulting graphical model built by a corresponding graphic designer is illustrated in FIG. 5. The user interface of FIG. 5 shows a number of business entities like "Customer", their properties and their relationships among each other.

Figure 6:
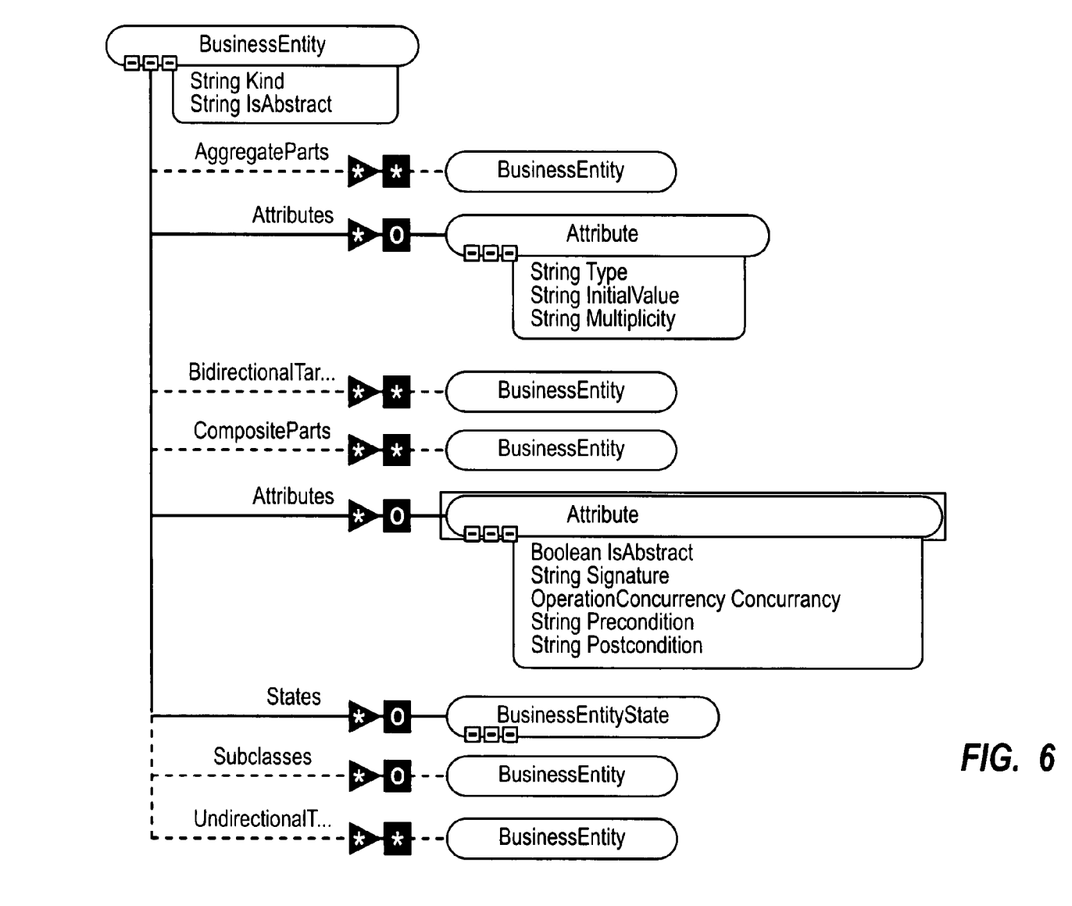
FIG. 6 illustrates a graphical tree of the user interface of FIG. 5.

The underlying designer schema defines a domain class "Business Entity", which are visualized in the designer above. The designer end user is creating objects like "Customer" with this designer. Here is the definition of the domain class "BusinessEntity". FIG. 6 illustrates the graphical design declarative definition as a graphical tree.

Figure 7:
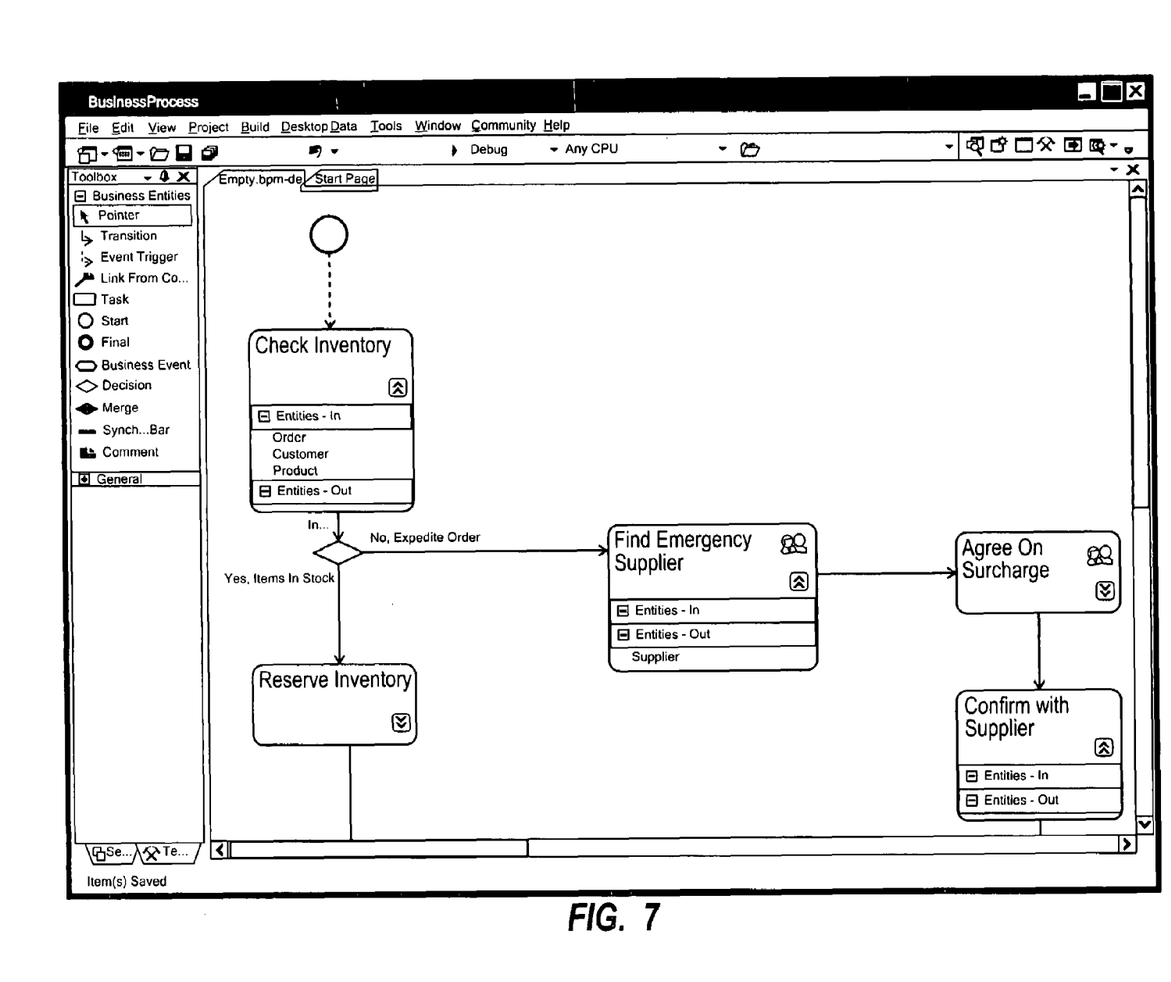
FIG. 7 illustrates a user interface of another graphical designer.

In another graphical designer, a business analyst might define a business process and which business entities are used in a specific process step. FIG. 7 illustrates a user interface that shows a graphical model resulting from a second graphical designer.

The user interface of FIG. 7 illustrates a business process. The process starts with a step labeled as 'Check Inventory'. The diagram shape shows a number of business entities involved in this process step, like 'Order' or 'Customer'. Those objects are defined in the domain mode of the other designer and are reused in this graphical designer.

Figure 8:
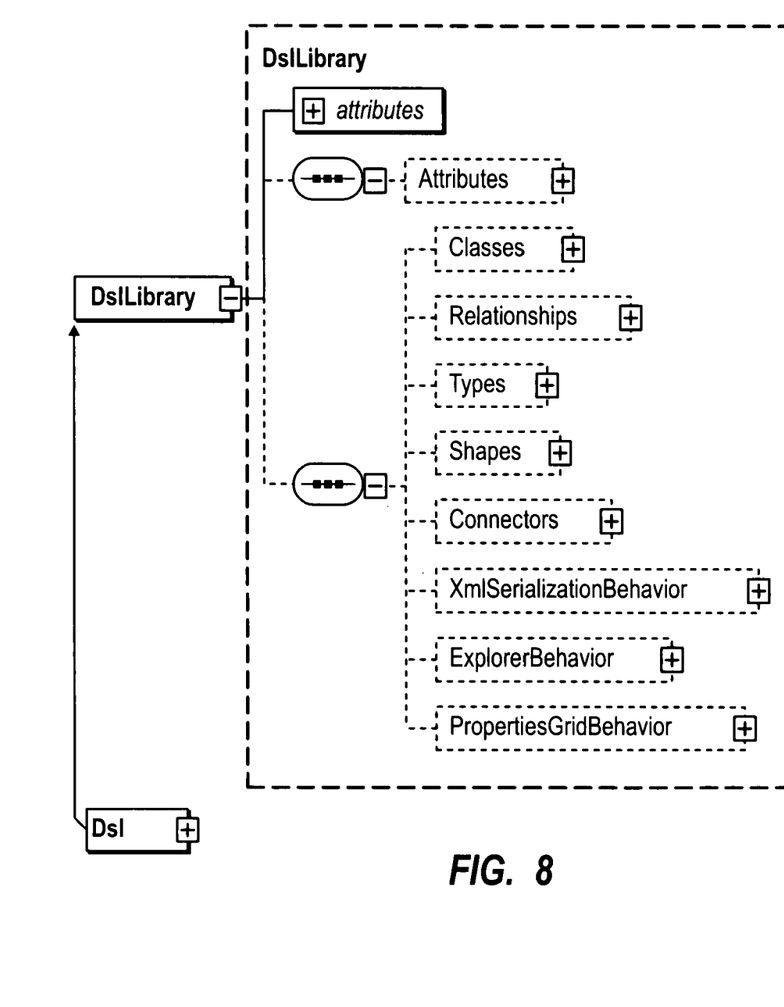
FIG. 8 illustrates a hierarchical structure of a common shared element library.

FIG. 8 shows an example of the hierarchical structure of a graphical design declarative definition (illustrated having parent node "Dsl") including an element (having parent node "DslLibrary") that defines a portion of the declarative definition in which shared elements may be defined for use by other graphical designers.

Although methods have been described with respect to FIG. 4, the principles of the present invention extend to computer program product comprising one or more computer-readable media having thereon one or more computer-executable instructions that, when executed by one or more processors of the server computing system, cause the computing system to perform all or portions or either or both of these methods. For instance, referring to FIG. 1, memory 104 and communication channels 108 may represent examples of such computer-readable media. The memory 104 represents an example of physical computer-readable media in the form of physical storage and/or memory media. The principles of the present invention also extend to computing systems themselves that are configured through hardware, software, or a combination of hardware and software, to perform all of portions of the methods of FIG. 4.

Accordingly, the principles of the present invention permit the reuse of shared elements amongst multiple graphical designer declarative definitions. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having thereon computer-executable instructions such that, when executed by one or more processors of a computing system, the computer-executable instructions cause the computing system to perform the following:
   evaluating a plurality of elements of a graphical designer, at least one element defined internal to the graphical designer and at least one element being a shared element;
   identifying at least one shared element and identifying at least one non-shared element, each identification being based upon a declaration of each identified element;
   interpreting a declarative definition of the graphical designer that includes a declaration of at least one shared element,
      the shared element including a component of a domain model including at least one of a domain class, a relationship amongst domain classes, and an enumeration element, and
      the shared element appearing in a schema definition;
   generating instruction sequences abiding by the specification defined by the declarative definition;
   an act of referring to a declarative definition of the shared element that is external to the declarative definition of the graphical designer, the act of referring not including a complete declarative definition of the shared element; and
   an act of implementing the shared element within the graphical designer using the declaration of the shared element in the declarative definition of the graphical designer, and using the external declarative definition of the shared element.

2. A computer program product in accordance with claim 1, wherein the one or more computer-readable storage media is physical memory media.

3. A computer program product in accordance with claim 1, wherein the one or more computer-readable storage media is physical storage media.

4. A computing system comprising at least one computer processor and comprising the computer program product recited in claim 1.

5. A computer program product in accordance with claim 1, wherein the computer-readable storage media further has thereon computer-executable instructions that, when executed by the one or more processes, further causes the computing system to perform the following:
   an act of interpreting a declarative definition of an unshared element that is internal to the declarative definition of the graphical designer.

6. A computer program product in accordance with claim 5, wherein the computer-readable storage media further has thereon computer-executable instructions that, when executed by the one or more processors, further causes the computing system to perform the following:
   an act of implementing the unshared element using the declarative definition of the unshared object type.

7. A computer program product in accordance with claim 1, wherein the shared element is a first shared element in a first class of elements, wherein the computer-readable storage media further has thereon computer-executable instructions that, when executed by the one or more processors, further causes the computing system to perform the following:

an act of detecting a declaration of a second shared element of a second class of elements within the declarative definition of the graphical designer;

act of referring to a declarative definition of the second shared element that is external to the declarative definition of the graphical designer; and an act of implementing the second shared element within the graphical designer using the declaration of the second shared element in the declarative definition of the graphical designer, and using the external declarative definition of the second shared element.

8. A computer program product in accordance with claim 1, wherein the shared element is a first shared element and the graphical designer is a first graphical designer, wherein the computer-readable storage media further has thereon computer-executable instructions that, when executed by the one or more processors, further causes the computing system to perform the following:

an act of interpreting a declarative definition of a second graphical designer that includes a declaration of at least a second shared element;

an act of referring to a declarative definition of the second shared element that is external to the declarative definition of the second graphical designer; and an act of implementing the second shared element using the declaration of the second shared element in the declarative definition of the second graphical designer, and using the external declarative definition of the second shared element.

9. A computer program product in accordance with claim 8, wherein the declarative definitions of the first and second shared elements are accessed from a shared library data structure.

10. A computer program product in accordance with claim 1, wherein the shared element is a first shared element and the graphical designer is a first graphical designer, wherein the computer-readable storage media further has thereon computer-executable instructions that, when executed by the one or more processors, further causes the computing system to perform the following:

an act of interpreting a declarative definition of a second graphical designer that includes a declarative definition of at least a second shared element; and an act of implementing the second shared element using the declarative definition of the second shared element.

11. A computer program product in accordance with claim 10, wherein the declarative definitions of the first and second shared elements are accessed from a shared library data structure that is internal to the second graphical designer.

12. A computer program product in accordance with claim 1, wherein the shared element includes a component of a domain model including each of
a domain class,
a relationship amongst domain classes, and
an enumeration element.

13. A computer program product in accordance with claim 1, wherein the shared element includes a graphical notation including at least one of a shape, a connector, or a decorator element.

14. A computer program product in accordance with claim 1, wherein the declarative definition of the graphical designer includes a declarative definition of a mapping definition, the mapping definition comprising at least one of a TextDecoratorMap, an IconDecoratorMap, a ShapeMap, and a ConnectorMap.

15. A computer program product in accordance with claim 14, wherein the mapping definition comprises a TextDecoratorMap and the TextDecoratorMap maps values displayed in a decorator to values of an object.

16. A computer program product in accordance with claim 14, wherein the mapping definition comprises an IconDecoratorMap and the IconDecoratorMap maps values displayed in a decorator to values of an object.

17. A computer program product in accordance with claim 14, wherein the mapping definition comprises a ConnectorMap and the ConnectorMap maps a connector to a relationship between two domain objects and the ConnectorMap contains a list of one or more DecoratorMaps for the connector.

* * * * *